United States Patent [19]
Vallauri et al.

[11] Patent Number: 5,985,062
[45] Date of Patent: Nov. 16, 1999

[54] PRODUCTION PROCESS FOR ELASTOMER SLEEVES FOR COVERING ELECTRIC CABLE JOINTS AND ASSOCIATED SLEEVE

[75] Inventors: Ubaldo Vallauri, Monza; Francesco Portas, Quattordio, both of Italy

[73] Assignee: Pirelli Cavi S.p.A., Italy

[21] Appl. No.: 08/977,935

[22] Filed: Nov. 24, 1997

Related U.S. Application Data

[63] Continuation of application No. 08/441,324, May 15, 1995, abandoned.

[30] Foreign Application Priority Data

May 19, 1994 [IT] Italy .................................. MI94A1018

[51] Int. Cl.$^6$ .................................................. B65H 81/06
[52] U.S. Cl. ................................ 156/51; 156/52; 156/86; 428/34.6; 428/34.7; 428/34.9
[58] Field of Search .................................. 156/51, 52, 86; 428/34.6, 34.7, 34.9

[56] References Cited

U.S. PATENT DOCUMENTS

| | | | |
|---|---|---|---|
| 4,363,842 | 12/1982 | Nelson | 428/35.8 |
| 4,822,952 | 4/1989 | Katz et al. | 174/73.1 |

FOREIGN PATENT DOCUMENTS

| | | |
|---|---|---|
| 0422567 | 4/1991 | European Pat. Off. . |
| 2046032 | 11/1980 | United Kingdom . |
| WO9405064 | 3/1994 | WIPO . |

*Primary Examiner*—Francis J. Lorin
*Attorney, Agent, or Firm*—Norris, McLaughlin & Marcus; L. P. Brooks

[57] ABSTRACT

The process calls for extrusion of a multilayer tubular structure with semiconducting innermost layer. In production of the sleeve the inner layer is partially removed leaving only a central portion forming an electrode. In addition the intermediate layer is made with a compound having predetermined relative dielectric constant and dielectric rigidity.

11 Claims, 5 Drawing Sheets

PRODUCTION PROCESS FOR ELASTOMER SLEEVES FOR COVERING ELECTRIC CABLE JOINTS AND ASSOCIATED SLEEVE

This application is a continuation, of application Ser. No. 08/441,324, filed May 15, 1995 now abandoned.

FIELD OF THE INVENTION

The present invention relates to a production process for prefabricated elastomer sleeves for covering electric cable joints.

Specifically the present invention relates to covering sleeves designed to be applied on joints or terminals of cables in medium- or high voltage electric lines. Because of the high electrical potentials in play (on the order of tens or hundreds of kV) which cause locally very high electric field gradients, there is a risk that insulating layers might be damaged by electrical discharges, compromising the functionality of the sleeve.

As known, in the production of electric cable joints it is provided that at the ends of the cables to be joined the conductor of each cable is locally deprived of the protective and insulating elements covering it in order to be connected with the conductor of the other cable.

Then, the elastomer sleeve is first fitted in an elastic expansion condition on a cylindrical tubular support body of rigid plastic material engaged around one of the cables before completion of the joint. Subsequently, after completion of the conductor connection, the tubular body is removed from the elastomer sleeve so that the latter can shrink elastically and tighten upon the cables at the joint.

Special care must be given to control the distribution of the electrical field in the conductor joint area. Indeed, as mentioned, the high voltage can bring about high electrical field concentrations in the presence of breaks or geometrical irregularities. Said concentrations can result in perforation of the sleeve layers.

To control electrical field distribution in the joint area two techniques are employed. The first calls for the use of insulating or field control resins (optionally in the form of self-amalgamating tapes) as fillers of the empty spaces in the conductor joint area. This permits annulling or reducing the irregularities of form of the conductor and a steadier distribution of the electric field lines in the surrounding area. The second technique calls for employment of a tubular conductive shield (commonly termed electrode or deflector) applied inside the sleeve and around the conductors. There is thus created a sort of Faraday cage with constant potential which annuls the effect due to form irregularity of parts inside the electrode.

The first technique has the shortcoming of requiring specific machining by the assembler when making the joint. This increases joint making time and introduces a risk factor due to the possibility of manufacturing errors.

To realize a sleeve with incorporated electrode, different solutions can be applied.

It is possible to manufacture the electrode by molding and then causing the electrode to adhere to the sleeve. As an alternative it is possible to merely expand the electrode on a support separate from that of the sleeve so as to mount it subsequently on the connection area of the two conductors of the cables to be connected. Or the electrode can be mounted separately on the same support on which is then mounted the sleeve. Or also it is possible to apply the electrode as a layer of semiconductive varnishes.

In all cases, it is difficult to ensure precise centering of the electrode in relation to the sleeve and the conductor joint and its correct operation.

All these methods also do not permit obtaining the electrode in an industrially valid manner with reduced costs.

Then there is the problem of controlling the distribution of the electrical field in a sleeve of the above type so as to prevent the creation of field concentrations capable of damaging the sleeve.

SUMMARY OF THE INVENTION

The present invention therefore—in a first aspect—relates to a process for the production of a covering sleeve for a medium-voltage cable joint comprising the following steps:

extruding together a multilayer tubular structure comprising an internal semiconductor layer, an intermediate field-control layer and an external insulating layer, cutting lengths of said tube having each a length corresponding to that of the sleeve, removing from each length the internal semiconductor layer leaving only a central portion in relation to the length with formation of an electrode, shaping each length, and applying to the length additional layers and sheaths.

In a second aspect, the present invention relates to a covering sleeve for a medium voltage electric cable joint comprising:

an insulating external layer, an intermediate field-control layer, and a conductive shield provided in the central zone of the field-control layer and characterized in that the conductive shield is a residual portion of a partially removed layer and in that the field-control layer has a relative dielectric constant between 6 and 12 and a dielectric rigidity greater than 5 kV/mm.

Further characteristics and advantages of the process and sleeve in accordance with the present invention are set forth in the description of an embodiment thereof given below by way of non-limiting example with reference to the annexed drawings.

DETAILED DESCRIPTION OF THE INVENTION

Figure 1:
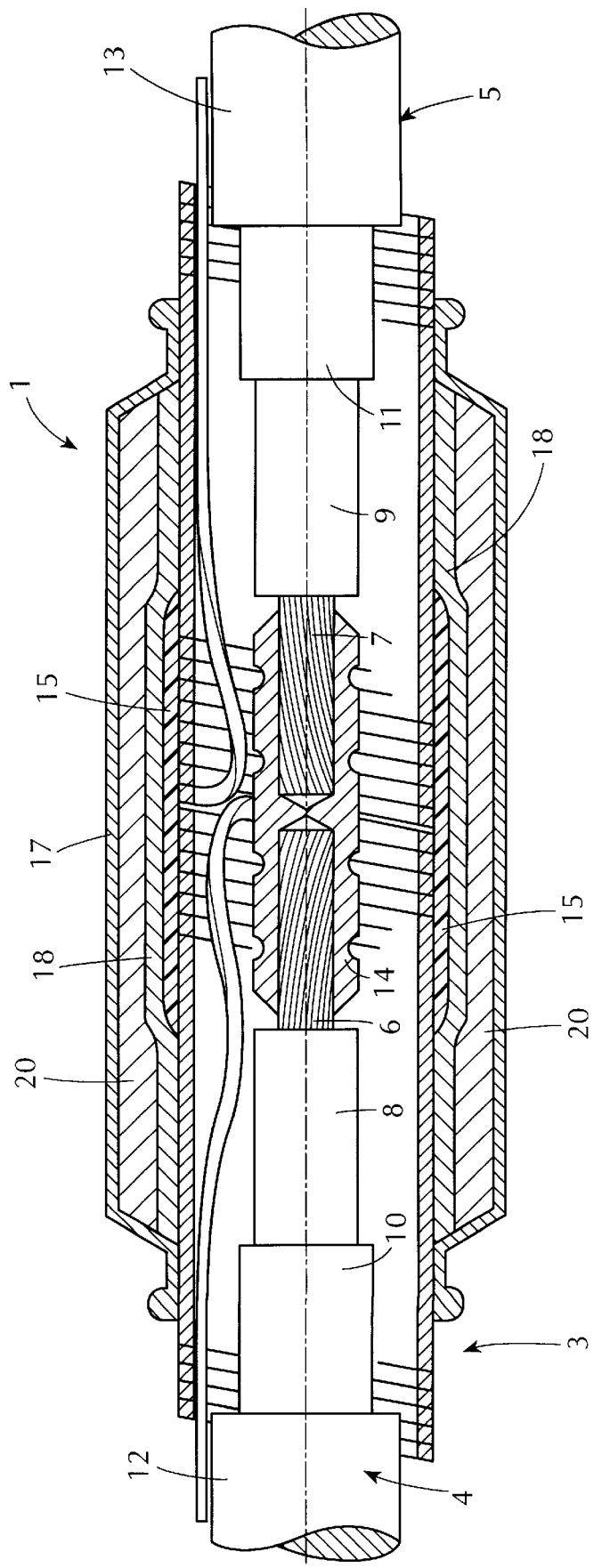
FIG. 1 shows a schematical cross section of a covering sleeve in accordance with the present invention fitted over two jointed electrical cables before removal of the support which holds them expanded.

With reference to the figures reference number 1 indicates as a whole an elastic sleeve fitted in elastically expanded condition on a support 3 for protection of the joint between two electric cables 4 and 5, e.g. for medium voltage (10–30 kV). The support 3 is e.g. of the two-part type in accordance with European patent application no. EP-A-0541000 field in the name of the assignee of this application.

The cables 4 and 5 comprise respective conductors 6 and 7 covered by respective insulations 8 and 9. Externally of the insulations are normally provided capacitive shields 10 and 11 of semiconductor material and external protective sheaths 12 and 13.

Opposite the junction between the electric cables 4 and 5 all the above said elements of the cables 4 and 5 are removed one after the other as shown in FIG. 1. The dimensions of the uncovered portions of each element are established accurately by standards, e.g. French standard EDF HN 68-S-08 dated June 1987. The bare portions of the conductors 6 and 7 are joined together by a metal clamp 14 tightened on the conductors 6 and 7 or by welding or otherwise.

The sleeve 1 is provided of elastomer material with particular elastic and electrical characteristics in accordance with the present invention.

Specifically said sleeve 1 for employment in the field of medium voltages, e.g. for 24 kv lines, provides an outer sheath 17, an external insulation layer 20, an intermediate layer 18 with field control and an internal electrode or deflector 15.

The electrode 15 is a portion of an internal layer 16 of semiconductor material present in the finished sleeve 1 only in the middle portion thereof.

The electrode 15 which has the purpose of nullifying the electrical field in the area around the clamp 14, after assembly, surrounds the conductors 6, 7 forming a sort of Faraday cage around the clamp 14 so that the free spaces where the insulation is removed do not require fillers.

The intermediate layer 18 of the so-called field control type, capable of reducing the electrical field intensity present at the ends of the electrode 15, is made out of elastomer material having a predetermined relative dielectric constant and dielectric rigidity.

The ends of said layer 18 in assembly of the sleeve 1 are located accurately in relation to the ends of the shields 10, 11 so that the electrode 15 centered on the clamp 14 can correctly perform its functions.

The internal structure of the sleeve 1 comprising the layers 16, 18 and 20 is manufactured by means of simultaneous extrusion of the three layers with achievement of an unbroken multilayer tubular structure 19.

A subsequent phase of vulcanization and winding on a coil allows completion of the processing phases of the multilayer tubular structure 19 in a manner basically like that of a medium/high voltage energy conveyance cable having extruded insulator.

Using in the extrusion an appropriate metallic support, e.g. an aluminium tube with internal diameter of 12 mm and outside diameter of 16 mm (not shown) it is possible to perform the extrusion and subsequent vulcanization continuously.

Figure 2:
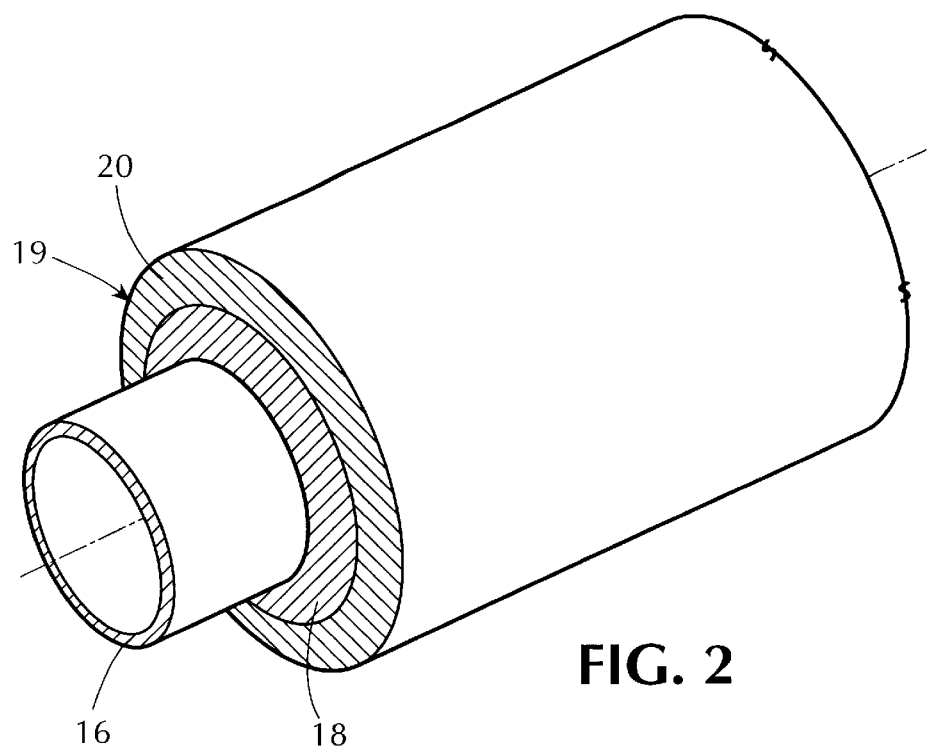
FIG. 2 shows a perspective view in partial cross section of a tubular structure from which the sleeve of FIG. 1 is made.

With particular reference to FIG. 2, at the end of the manufacturing process the multilayer tubular structure 19 comprises in radial succession from the inside towards the outside:

a semiconductor layer 16, e.g. 0.5 mm thick;

a field control layer 18 having a predetermined relative dielectric constant and dielectric rigidity and, e.g., thickness of 2.5 mm;

an insulating layer 20, e.g. with thickness of 8 mm.

The inside diameter (Di) of the multilayer tubular structure 19 is thus e.g. 16 mm while the nominal outside diameter (De) is 38 mm. The dimensions set forth are suitable for providing a sleeve for cables having insulation diameter between 20 mm and 32 mm.

The tubular structure 19 is then cut in lengths each designed to form a single sleeve 1. Naturally the lengths resulting from the cut are appropriately shaped and provided with accessories as set forth below.

The tubular structure 19 before being cut can usefully be tested to verify its electrical characteristics thanks to the presence of the continuous semiconductor internal layer 16.

For this purpose graphitization of the insulating outer surface of the tubular structure 19 is performed to make said surface electrically conductive. Preferably there is applied simultaneously also a semiconductor textile tape, e.g. based on polyammide cloth, and a metallic shield comprising e.g. one or more copper ribbons 0.07 by 35 mm with 5 mm overlap.

The electrical testing, in a manner like that used for medium voltage cables having extruded insulator, consists of an alternating current screening test at a voltage of 60 kV for a period of 30 minutes followed by measurement of partial discharges: <10 pC (pico Coulomb) at 24 kV, in accordance with standards derived from CEI 20-13 or IEC 502.

All the layers of the tubular structure 19 are made out of special compounds (semiconductor, field control, insulating) described e.g. in European patent applications nos. 0379056, 0393495 and 0422567 filed in the name of the Assignee of this applicant. In the description given below is indicated a composition of a special compound for the intermediate field control layer 18 especially suited for the purposes of the present invention.

To widen the range of diameters of cables on which a single sleeve type can be mounted recourse can be had to a solution described in European patent application no. 0393495. This solution calls for the use of the encircling semiconductor sheath 17 fitted with negative allowance on the 3-layer sleeve made from the tubular structure 19 and preferably obtained also by continuous extrusion and vulcanization. In the example described the dimensions are Di=16 mm and De=26 mm, and permit to fit cables having a wide range of diameters.

In addition the sleeve 1 can be provided with a metallic shield, not shown in the figures, formed e.g. from a tinned copper wire braid and a protective sheath not shown.

The process in accordance with the present invention permits making the electrode 15 by mere removal of the excess of the layer 16 lengthwise inside the length of tubular structure 19.

For this purpose there is performed a machining process with an appropriate tool allowing removal of the excess of the layer 16 at the ends of the sleeve 1 to obtain an electrode 15 with the desired dimensions.

Figure 3:
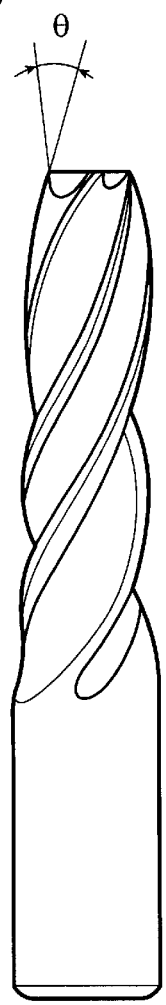
FIG. 3 shows a front view of a tool employed in the process in accordance with the present invention.

A tool suitable for performing this operation is shown in FIG. 3. The form of said tool is derived from a milling tool. But it is possible to use with comparable results a grinding wheel type tool.

The starting thickness of the semiconductor layer 16 from which is obtained the electrode 15 is preferably less than 1 mm, e.g. 0.8 mm, in such a manner as not to have considerable variations of the sleeve inside diameter.

The border zone between the field control layer 18 and the electrode 15 is clear, i.e. without rounding. The bevel angle, θ determined by the cutting angle of the tool, is preferably less than 15°, e.g. 7°, to allow the elastic effect to completely spread the bevelled portion without leaving empty spaces once the sleeve 1 is mounted on the support 3.

The above mentioned basically pointed form of the electrode 15 is made possible in accordance with the present invention by the employment of appropriate compounds whose composition is described below. Specifically said compounds allow obtaining the layer radially most inward having pre-set relative dielectric constant and dielectric rigidity capable of supporting the electric gradient at the tip of the electrode.

For correct electrical operation of the sleeve 1 it is necessary that some phases of the process in accordance with the present invention be performed with the greatest care and specifically:

1) machining must be performed in such a manner as to completely remove the semiconductor layer over the entire predetermined length so as to obtain a correct 'line of escape', and 2) the intermediate field control layer 18 must have electrical properties such as to permit overcoming all the expected electrical stresses.

Specifically, when under these circumstances there is a zone with concentrated electrical gradient at the end of the electrode the severest test to be passed, as is well known to those skilled in the art, becomes the pulsed rigidity test at the highest expected overload temperature.

In the embodiment described herein it is sought to overcome with a margin of approximately 20% the pulsed voltage of 150 kV, ±10 pulses at 130° C.

To achieve this result it became necessary to carry out a series of tests before completing definition of the present invention. Said tests are described below for completeness of exposition.

Figure 4:
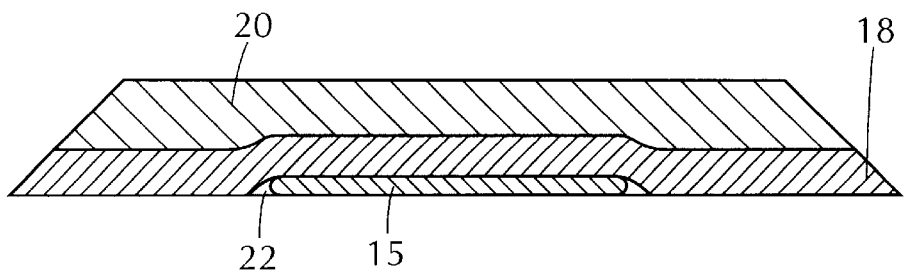
FIG. 4 shows schematically an embodiment of the sleeve used in the tests set forth below.

The sleeve used initially comprised:

an internal layer with high relative dielectric constant (equal to or higher than 15) having diameter 17 mm and thickness 2.5 mm such as e.g. that described in European patent application no. 0393495 as tubular layer 4 with reference to FIG. 4 of said application, an insulating layer having a thickness of 8 mm and diameter 38 mm such as e.g. that described as a tubular layer 5 in FIG. 4 of said application, and an encircling semiconductor sheath having at rest the dimensions Di=16 mm and De=26 mm. A formulation example is described in the above mentioned European patent application no. 0393495.

First there were performed five tests in which the electrode 15 consisted of a very thin semiconductor layer with thickness 0.1–0.2 mm and length 220 mm and vulcanized in the center of the sleeve whose length at rest was 350 mm.

In these tests the sleeves were mounted on MV cables insulated with XLPE (reticulate polyethylene) with cross section 1 by 95 $mm^2$ and insulating diameter 23 mm.

All the joints passed a rapid alternating current test at a voltage of 55 kV for 5 minutes. The partial discharge measurement showed that they were <10 pC at 24 kV.

In addition all the joints passed the pulsed test at surrounding temperature starting at 100 kV (±10 pulses) and rising to 25 kV at each step up to 150 kV (±10 pulses).

The same test was repeated at 130° C. and the results are set forth in the annexed Table 1 and commented below:

sleeve no. 1: pierces at the 3rd pulse with positive polarity at 150 kV, sleeve no. 2: pierces at the 10th pulse with negative polarity at 150 kV after withstanding at the 10 pulses with positive polarity, sleeve no. 3: behaves like no. 2.

To appraise the influence of test temperature sleeve no. 4 was brought to piercing at surrounding temperature (again starting at 100 kv ±10 pulses). Under these conditions it pierced at 175 kV at the 2nd pulse with negative polarity and after withstanding the 10 pulses with positive polarity.

Figure 5:
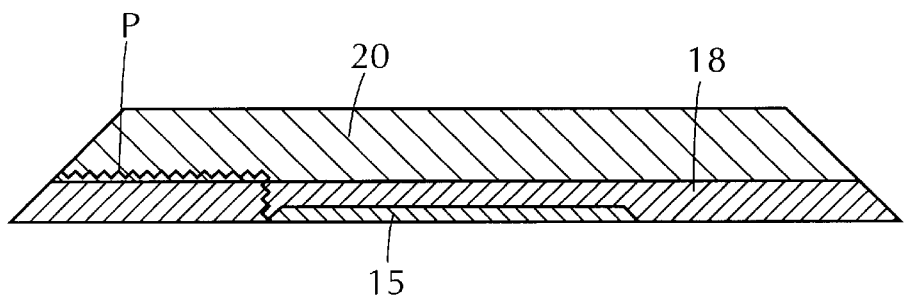
FIGS. 5 to 10 show schematically the distribution of a discharge in the sleeves of the examples.

Sleeve no. 5 was tested only at 13° C. Under these conditions it pierced at 175 kV at the 2nd pulse with positive polarity. FIG. 5 shows schematically the path of the discharge, i.e. piercing P due to the discharge.

In all five cases the piercing started at one end or tip of the electrode and affected only the inner layer with high relative dielectric constant.

Basically it was observed that the 'tip' effect due to the thin electrode causes piercing of the high relative dielectric constant layer at pulsed voltages on the order of 150 kV (thus insufficient).

Test temperature has a limited influence on piercing voltage.

For further comparison a joint made without an electrode was subjected to a similar test, i.e. filling the empty spaces with a self-amalgamating tape of the NITTO type. At 130° C. the joint withstands the test at ±200 kV while it pierces at the first 225 kV pulse.

Further experimental tests were performed on other sleeves in which the ends of the electrode were rounded and no longer with sharp corners.

Three assemblies were made (sleeves nos. 6, 7 and 8 of Table 1) with sleeves having the electrode with rounded edge with radius R=0.20 mm and overall thickness 0.4 mm. Length was identical to that of the previous ones and equal to 220 mm at rest.

The three sleeves were again mounted on the same type of XLPE insulated cable with cross section of 1 by 95 $mm^2$ and insulating diameter equal to 23 mm.

Again in this case the sleeves passed a rapid alternating current test at a voltage of 55 kV for 5 minutes and the partial discharges were <10 pC at 24 kV.

Finally in the pulsed test all three sleeves withstood a voltage of 150 kV (±10 pulses) at surrounding temperature and again pierced at 150 kV at 130° C. with piercing behaviour the same as the above.

From these results it is clear that the rounding made at the end of the electrode with curvature radius R=0.2 mm is insufficient to reduce the 'tip' effect.

A series of tests was then carried out to clarify whether the thicker and hence better rounded electrode at the end might permit improvement of pulsed performance. In addition, to simplify performance, recourse was had to electrodes fitted separately from the sleeve on a separate support.

Simultaneously it was sought to make clear the effect of the presence of the internal layer with high relative dielectric constant in the sleeve.

The results of these further tests are set forth in Table 2.

In tests nos. 2 and 3 an electrode was used with dimensions Di=16 mm, De=20 mm, curvature radius R equal to 1 mm and length at rest 220 mm.

The cable used for the tests is comparable to the previous ones.

In addition in test no. 2 was used a sleeve without the high relative dielectric constant layer while in test no. 3 the sleeve included the layer with high relative dielectric constant.

The results are as follows: piercing takes place again at pulsed voltage of 150 kV at 130° C.

Therefore, even using an electrode with curvature radius R at its ends of 1 mm the situation does not improve.

Test no. 3 shows that the layer with high relative dielectric constant employed for the sleeve is not able to reduce the 'tip' effect on the electrode and in fact the discharge runs through just this layer.

The other two tests nos. 4 and 5 were performed using a thicker electrode as shown in FIG. 4 with a thickness of 5 mm instead of 2 mm. Such an electrode is better rounded having a curvature radius R=2.5 mm at the end. In addition bevels were added filling the empty spaces around the bevels with a compound 22 with pre-set relative dielectric constant and improved dielectric rigidity.

The results obtained are again set forth in table 2 and commented on below:

Test no. 4 shows a decided improvement over test no. 2.

In test no. 5 the discharge took place at the usual 150 kV level with pulsing at 130° C. and has the usual behaviour of the initial tests.

It thus emerged from the entire series of tests that the weak point of the system is not so much linked to the tip effect, which is linked to the form of the electrode end, but more probably to the intrinsic dielectric rigidity of the field control layer adopted for the sleeve and at the value of its relative dielectric constant.

Finally it was clear, as identified previously, that the employment of an electrode separate from the sleeve presents risks of erroneous positioning if it is mounted on the same support as the sleeve while it is too costly and impractical to apply it on a separate support from that of the sleeve.

In accordance with the present invention the solution of the problem set forth above calls for the employment of a vulcanized electrode adhering perfectly to the other layers of the sleeve and obtained by continuous extrusion with reduced thickness (0.6 mm with typical thickness of 0.5 mm) whose excessive length is removed by a simple machining and using also for the field control layer a compound characterized by relative dielectric constant values lower than the conventionally used values and by dielectric rigidity values higher than those of the compounds of known type.

Advantageously in accordance with the present invention the field control layer of the sleeve 1 is provided with a compound having a formulation (indicated as FORM. A in the Tables) permitting achievement of the pre-set objectives. The composition of the compound is as follows:

terpolymer ethylene-propylene-diene, e.g. that known in trade under the name DUTRAL-TER 4046-E3 of ENICHEM SYNTHESIS

| | |
|---|---|
| zinc oxide | 5 |
| calcined kaolin surface-treated with | 60 |
| carbon black, e.g. that known in trade under the name SEVACARB MT | 80 |
| paraffinic plastifier | 40 |

-continued

| | |
|---|---|
| poly 1.2 dihydro 2.4.4 trimethylkinolin | 1.5 |
| stearic acid | 1 |
| triallyl cyanurate | 1 |
| dicumyl peroxide | 3 |

The characteristics of the compound set forth above after reticulation are as follows:

| | |
|---|---|
| tensile strength | 6 MPa |
| elongation by % at tensile breakage | 600% |
| (module) load at 100% elongation | 1.5 mpa |
| residual deformation with elongation set at 50% determined in conformity with UNI 7321.74 on solid test specimen at 100° C. after 500 hours | 25% |
| relative dielectric constant determined in conformity with ASTM Std D 150 | 8 8 |
| volume resistivity determined in conformity with ASTM Std D 257 | $1.2 \times 10^{11}$ Ω cm |
| dielectric rigidity determined in conformity with ASTM Std D 149 | 7 kV/mm |
| For comparison purposes the electric characteristics of the compound of known type with field control employed initially were as follows: | |
| relative dielectric constant | 15 |
| volume resistivity | $1.0 \times 10^{10}$ Ω cm |
| dielectric rigidity | 3 kV/mm |

Three sleeves obtained by extrusion with dimensions and conformation similar to those described in FIG. 1 complete with encircling semiconductor sheath, metallic shield and protective sheath were subjected to the usual series of tests after mounting on the typical MV cable insulated with XLPE with cross section of 1×95 mm$^2$, D insulation 23 mm.

The results of the tests are summarized in Table 3.

The new field control compound (see tests nos. 7, 8 and 9) permits achieving values of pulsed rigidity considerably higher (200 kV as against 150 kV achievable with the previous compound).

It is deemed that the result achieved is attributable to the values of the relative dielectric constant and dielectric rigidity of the field control material. In the materials of the known art said values were equal to approximately 15 and 3 while in the above compound they are equal to approximately 8 and 7 respectively. It is believed that it would be possible to achieve similar results with values of relative dielectric constant between 6 and 12 and with values of dielectric rigidity over 5 depending on to the specific application conditions.

Furthermore, the results obtained with tests nos. 7, 8 and 9 indicated that even with a very thin electrode (approximately 0.5 mm) from which the extra length has been removed by machining (using the tool shown in FIG. 3) the dielectric rigidity is ensured by the field control layer.

The continuous process in accordance with the present invention exhibits doubtless advantages in comparison with conventional methods such as e.g. molding which is a discontinuous process and also requires a great variety of high-cost molds to produce the different sleeve sizes.

Another important advantage of the present invention is the fact that it is possible to proceed with electrical testing of a complete piece (even 500 to 1000 m) wound on a coil instead of individual sleeves as takes place with the molding technique.

TABLE 1

Summary of tests on elastic joints with semiconductive central electrode
Tests on XLPE cable 1 × 95 mm² without filler in terminal zone and Nitto high dielectric constant tape upon semiconductive cutting of cable.

Figure 11:
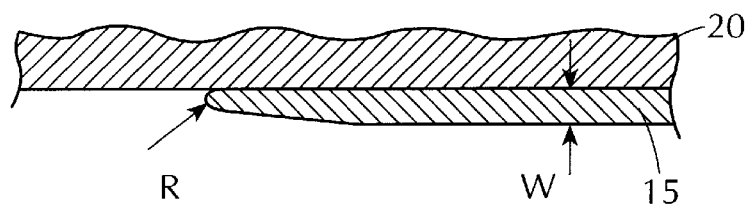
FIGS. 11 to 16 show schematically the end form of some samples of semiconductive electrodes.
Figure 12:
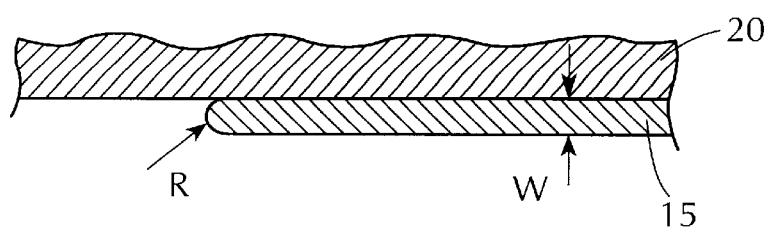

| No. | End form of semiconductive electrode | Sleeve aged at 65° C. for 7 days | Electrical tests | | | | Piercing behaviour |
|---|---|---|---|---|---|---|---|
| | | | A.C. | Partial discharges | Pulse at surrounding temperature (±10 pulses) | Pulse at 130° C. | |
| 1 | knife blade | no | 55 kV for 5 min | 24 kV OK | ±150 kV OK | ✓ 3$^{rd}$ pulse at +150 kV ± | FIG. 5 |
| 2 | knife blade | no | 55 kV for 5 min | 24 kV OK 15 pc removed tape | ±150 kV OK | ✓ 10$^{th}$ pulse at −150 kV ± | FIG. 5 |
| 3 | knife blade | no | 55 kV for 5 min | 24 kV OK | ±150 kV OK | ✓ 10$^{th}$ pulse at −150 kV ± | FIG. 5 |
| 4 | knife blade | no | 55 kV for 5 min | 24 kV OK | +175 kV OK ✓ 2$^{nd}$ pulse at −175 kV | | FIG. 5 |
| 5 | knife blade | no | 55 kV for 5 min | 24 kV OK | | ±150 kV OK ✓ 2$^{nd}$ pulse at +175 kV | FIG. 5 |
| 6 | FIG. 11 R = 0.2 w = 0.4 | no | 55 kV for 5 min | 24 kV OK | ±150 kV OK | −150 kV OK ✓ 1$^{st}$ pulse at +150 kV ± | FIG. 5 |
| 7 | FIG. 11 R = 0.2 w = 0.4 | no | 55 kV for 5 min | 24 kV OK | ±150 kV OK | ±125 kV OK ✓ 1$^{st}$ pulse at +150 kV ± | FIG. 5 |
| 8 | FIG. 12 R = 0.2 w = 0.4 | no | 55 kV for 5 min | 24 kV OK | ±150 kV OK | ±125 kV OK ✓ 1$^{st}$ pulse at +150 kV ± | FIG. 5 |

(✓ = piercing)

TABLE 2

Summary of tests on elastic joints with separate tubular semiconductive electrode
Tests on XLPE cable 1 × 95 mm²

Figure 6:
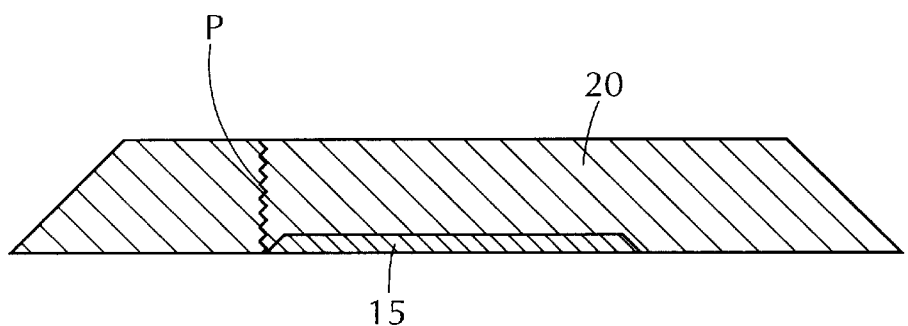
Figure 13:
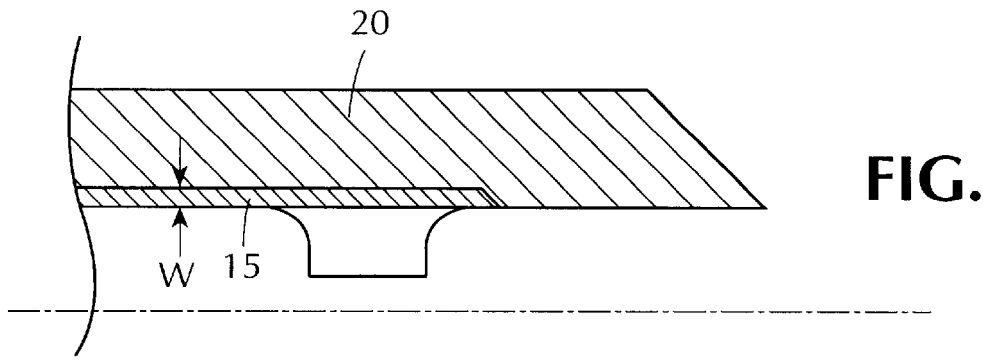

| No. | End form of semiconductive electrode | Type of sleeve | Electrical tests | | | | Piercing behaviour |
|---|---|---|---|---|---|---|---|
| | | | A.C. | Partial discharges | Pulse at surrounding temperature | Pulse at 130° C. | |
| 2 | FIG. 13 w = 1 mm | one layer | 55 kV for 5 min | 24 kV OK | ±150 kV OK | +150 kV OK ✓ 1$^{st}$ pulse at −150 kV ± | FIG. 6 |

TABLE 2-continued

Summary of tests on elastic joints with separate tubular semiconductive electrode
Tests on XLPE cable 1 × 95 mm²

Figure 7:
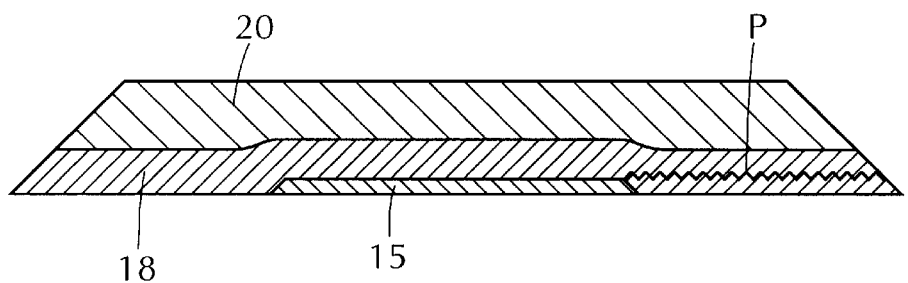
Figure 8:
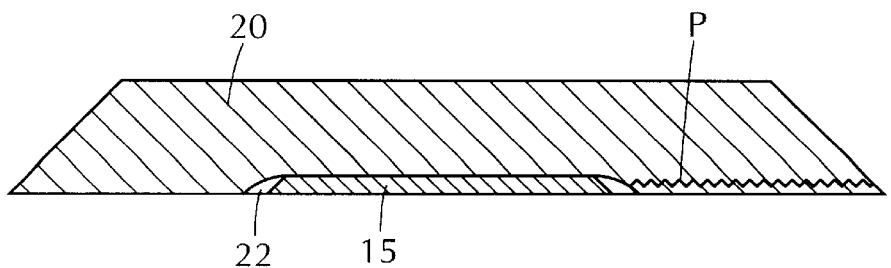
Figure 9:
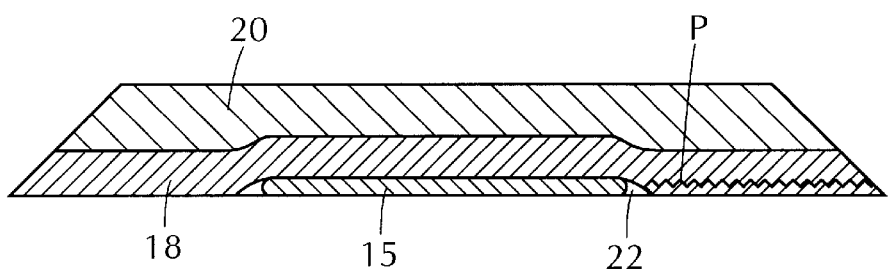
Figure 14:
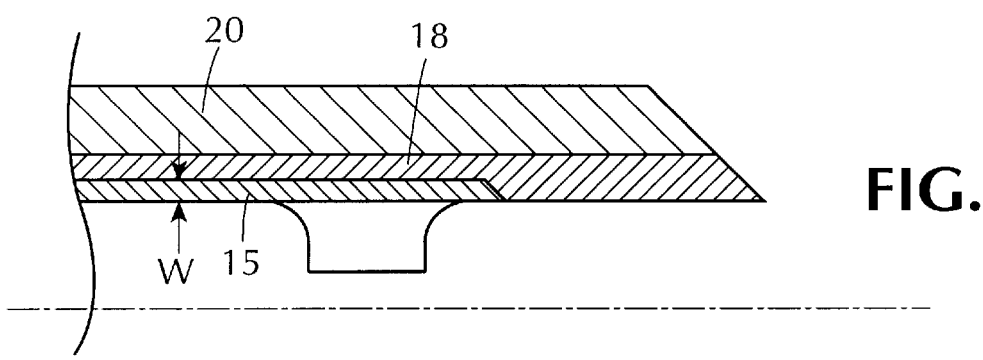
Figure 15:
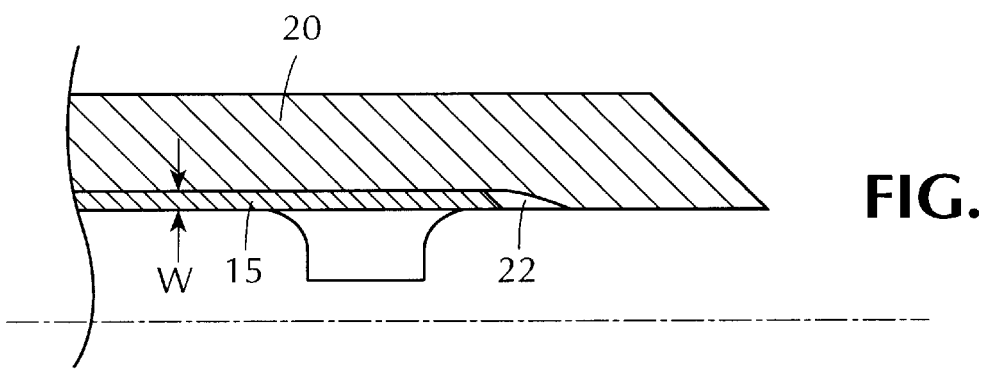
Figure 16:
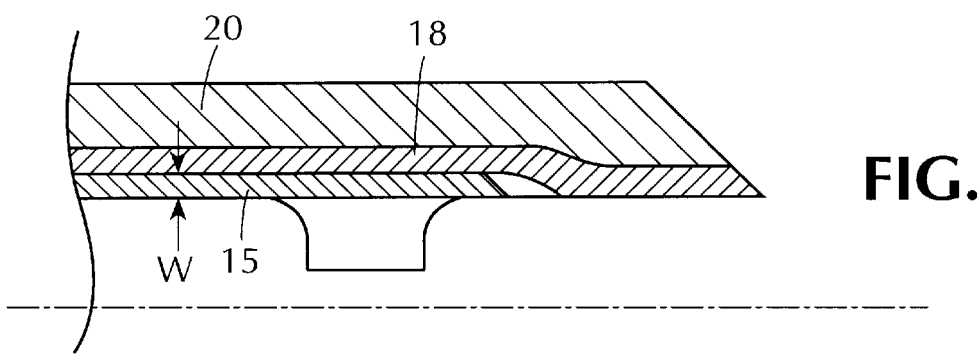

| | | | Electrical tests | | | | |
|---|---|---|---|---|---|---|---|
| No. | End form of semiconductive electrode | Type of sleeve | A.C. | Partial discharges | Pulse at surrounding temperature | Pulse at 130° C. | Piercing behaviour |
| 3 | FIG. 14 w = 1 mm | three layers | 55 kV for 5 min | 24 kV OK | ↙ 3$^{rd}$ pulse at −150 kV | | FIG. 7 |
| 4 | FIG. 15 w = 5 mm | one layer | 55 kV for 5 min | 24 kV OK | ±150 kV OK | ±225 kV OK ↙ 1$^{st}$ pulse at 250 kV ± | FIG. 8 |
| 5 | FIG. 16 w = 5 mm | three layers | 55 kV for 5 min | 24 kV OK | ±150 kV OK | ±125 kV OK ↙ 1$^{st}$ pulse at 150 kV ± | FIG. 9 |

( ↙ = piercing)

TABLE 3

Summary of tests on elastic joints with semiconductive electrode obtained by grinding a semiconductive layer

Figure 10:
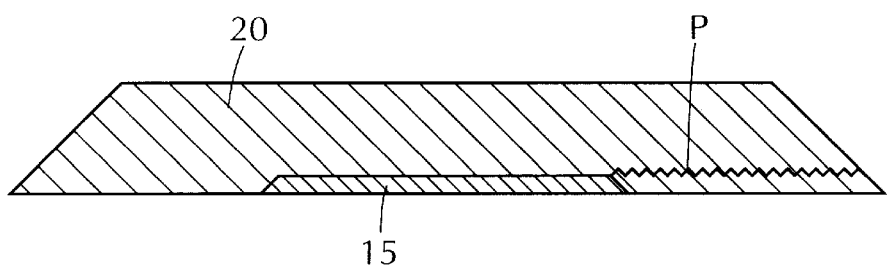

| | | | | | Electrical tests | | | | |
|---|---|---|---|---|---|---|---|---|---|
| No | End form of semiconductive electrode | Field control layer | Cross section of conductor of XLPE cable mm² | Support external diameter mm² | A.C. | Partial discharges | Pulse at surrounding temperature (±10 pulses) | Pulse at 130° C. | Piercing behaviour |
| 7 | FIG. 14 | Form A dark color ϵ = 10 | 95 | 56 | 55 kV for 5 min | NO at 24 kV | ±175 kV | +200 kV OK ↙ 1$^{st}$ pulse at −200 kV ± | FIG. 10 |
| 8 | 4 layers extruded with electrode as above | Form A dark color ϵ = 10 | 95 | 56 | 55 kV for 5 min | NO at 24 kV | ±175 kV | ↙ 1$^{st}$ pulse at −200 kV ± | FIG. 10 |
| 9 | as above without external semiconductive extruded sleeve | Form A dark color ϵ = 10 | 95 | 56 | 55 kV for 5 min | NO at 24 kV | ±175 kV | ↙ 7$^{th}$ pulse at −200 kV ± | FIG. 10 |

( ↙ = piercing)

We claim:

1. A process for the production of a covering sleeve for a medium-voltage cable joint comprising the following steps:

extruding together a multilayer tubular structure comprising an internal semiconductive layer, an intermediate field-control layer having a dielectric constant and a dielectric rigidity for controlling electrical field distribution and selected to substantially prevent electric discharge through the sleeve and an external insulating layer;

cutting lengths of said tube having each a predetermined length;

partially removing from each of the predetermined lengths the internal semiconductor layer leaving only a central portion thereof to provide an electrode of semiconductive material centered around the cable joint; and shaping each of the lengths.

2. Covering sleeve for a medium voltage electric cable joint comprising:

an insulating external layer, an intermediate field-control layer, and a conductive shield provided in the central zone of the field-control layer and characterized in that the conductive shield is a residual portion of a partially removed layer and in that the field-control layer has a relative dielectric constant between 6 and 12 and a dielectric rigidity greater than 5 kV/mm.

3. Covering sleeve in accordance with claim 2 in which the field-control layer is provided by an elastomer having the following mix:

| | |
|---|---|
| terpolymer ethylene-propylene-thiene | 100 |
| zinc oxide | 5 |
| calcined kaolin surface-treated with trimetoxyethoxy vinylsylane | 60 |
| carbon black | 80 |
| paraffinic plastifier | 40 |
| poly 1.2 dihydro 2.4.4 trimethylkinolin | 1.5 |
| stearic acid | 1 |
| triallyl cyanurate | 1 |
| diminyl peroxide | 3. |

4. The process of claim 1, wherein the intermediate field-control layer has a dielectric constant between 6 and 12.

5. The process of claim 1, wherein the intermediate field-control layer has a dielectric rigidity greater than 5 kV/mm.

6. The process of claim 1, wherein the extruding further comprises extruding the intermediate field-control layer having the relative dielectric constant equal to between 6 and 12 and the predetermined dielectric rigidity equal to greater than 5 kV/mm.

7. The process of claim 1, wherein the intermediate field-control layer comprises, in parts by weight, terpolymer ethylene-propylene-thiene about 100, zinc oxide about 5, calcined kaolin surface-treated with trimetoxyethoxy vinyl-sulane about 60, carbon black about 80, paraffinic plastifier about 40, poly 1.2 dehydro 2.4.4 treimethlykinolin about 1.5, stearic acid about 1, triallyl cyanurate about 1 and diminyl peroxide about 3.

8. The process of claim 1, further comprising the step of applying a conductive shield about the central portion of the internal semiconductive layer.

9. The process of claim 1, wherein the partially removing further comprises partially removing the internal semiconductor layer to form a conductive shield in the central portion and without substantial removal of the intermediate field-control layer.

10. The process of claim 1, wherein the partially removing comprises rounding an end of at least one of the electrodes of the lengths.

11. The process of claim 1, wherein each of the extruded layers is in contact with the next adjacent layer.

* * * * *

UNITED STATES PATENT AND TRADEMARK OFFICE
CERTIFICATE OF CORRECTION

PATENT NO. : 5,985,062
DATED : November 16, 1999
INVENTOR(S) : Vallauri et al

It is certified that error appears in the above-identified patent and that said Letters Patent is hereby corrected as shown below:

Col. 6, line 15, change "13° C" to –130° C--;

Col. 8, line 15, cancel "25%";

Col. 8, line 16, insert --25%-- at the end of the line

Col. 8, line 17, cancel "8".

Signed and Sealed this

Twenty-sixth Day of September, 2000

Attest:

Q. TODD DICKINSON

Attesting Officer

Director of Patents and Trademarks